(12) United States Patent
Ishida et al.

(10) Patent No.: US 7,188,649 B2
(45) Date of Patent: Mar. 13, 2007

(54) RUNFLAT TIRE SYSTEM AND SUPPORT RING THEREFOR

(75) Inventors: Takaaki Ishida, Kobe (JP); Masatoshi Tanaka, Kobe (JP); Yurie Tanami, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/065,480

(22) Filed: Feb. 25, 2005

(65) Prior Publication Data

US 2005/0211352 A1 Sep. 29, 2005

(30) Foreign Application Priority Data

Mar. 29, 2004 (JP) ............................. 2004-096261

(51) Int. Cl.
*B60C 17/04* (2006.01)
*B60C 19/00* (2006.01)

(52) U.S. Cl. .................... 152/158; 152/450; 152/520

(58) Field of Classification Search ............... 152/158, 152/520, 450
See application file for complete search history.

(56) References Cited

U.S. PATENT DOCUMENTS 3,486,545 A * 12/1969 Wittneben et al.
4,153,095 A * 5/1979 Sarkissian
6,726,289 B2 * 4/2004 Yukawa et al.
2002/0104600 A1 8/2002 Flament et al.
2002/0124924 A1 9/2002 Abinal et al.

FOREIGN PATENT DOCUMENTS

| JP | 62050203 A | * | 3/1987 |
| JP | 62216803 A | * | 9/1987 |
| JP | 3373596 B2 | | 11/2002 |
| JP | 2003-510209 A | | 3/2003 |

* cited by examiner

*Primary Examiner*—Adrienne C. Johnstone
(74) *Attorney, Agent, or Firm*—Birch, Stewart, Kolasch & Birch, LLP

(57) ABSTRACT

A runflat tire system comprises a pneumatic tire, a wheel rim on which the pneumatic tire is mounted, and a support ring made of elastic material and disposed in a cavity surrounded by an inner surface of the rim and an inner surface of the tire mounted thereon, wherein the support ring comprises an annular body extending in a circumferential direction of the tire and provided with a plurality of hollows opening at the cavity, and at least one noise damper made of sponge material having apparent density of 0.1 g/cm³ or less and disposed in the hollow such that the noise damper does not protrude into the cavity from an inlet surface of the hollow.

8 Claims, 10 Drawing Sheets

RUNFLAT TIRE SYSTEM AND SUPPORT RING THEREFOR

BACKGROUND OF THE INVENTION

1. Field of the Invention

The present invention relates to a runflat tire system which allows a vehicle to run safely at a constant speed through a predetermined distance even when an internal pressure of a tire is lowered.

2. Description of the Related Art

In recent years, a runflat tire system by which, even if the tire goes flat, it is possible to travel for a very long distance for example several hundred kilometers at a relatively high speed of up to about 80 km/hr has been proposed.

FIG. 8 shows a conventional system of this kind. The system comprises a tire "a", a wheel rim b on which the tire "a" is mounted, and a support ring e mounted on the wheel rim b in a cavity i surrounded by the tire "a" and the wheel rim b. When an internal pressure of the tire is reduced, the support ring e contacts against an inner surface of a tread portion d to support a load of the tire. The wheel rim b comprises first and second seats b1 and b2 on which first and second bead portions f1 and f2 of the tire "a" are mounted. A mounting part g for the support ring e is provided between the seats b1 and b2.

In this system, as shown in FIG. 9, when the internal pressure of the tire "a" is reduced due to puncture or the like, the inner surface d1 of the tread portion d contacts against the support ring e. A load applied to the tire "a" is supported by the support ring e and the wheel rim b. Since the first bead portion f1 and the second bead portion f2 are locked between a rim flange and a hump h, the vehicle can run at such speed that no problem is caused in a runflat manner. This system eliminates a need for exchanging tires on a road shoulder, and allows the vehicle to move to a gas station or a service garage. Thus, it is desired that the runflat tires become widespread in terms of safety at the time of high speed running in addition to convenience and comfort.

As noises generated by a tire, there is a road noise. The road noise is generated if air resonates in the cavity i when a vehicle runs on a rough road, and the road noise causes a roaring sound in a frequency range of about 50 to 400 Hz. The road noise is transmitted into a passenger room and becomes a muffled sound, and this offends a passenger in the vehicle.

Like general tires, it is important to reduce the road noise for improving habitability also in the runflat tire system.

Conventionally, Japanese Patent No. 3373596 proposes a runflat system as shown in FIG. 10 in which a tire resonance preventing member q made of porous material or fiber material is disposed around an outer surface of a core body p having substantially T-shaped cross section. This technique is intended for the reduction of cavity resonance having main frequency of around 250 Hz at which the resonance becomes a noise.

As shown in FIGS. 11 and 12, Japanese Patent Application publication No. 2003-502200 (WO 00/76791 A1) proposes a runflat system in which an annular supporting body r mounted on a rim forms a resonator comprising a large number of cavities u defined by supporting wall portions w3 between an outer peripheral wall w1 and an inner peripheral wall w2, and a sidewall w4 closes the resonator. The sidewall 4 is provided with tubes v which are in communication with the cavities. In this proposal, vibration characteristics of the resonator is optimized by the tubes v based on the principle of the Helmholtz resonator, thereby suppressing the resonance.

According to the former system, however, the tire resonance preventing member q mounted on the surface of the core body p comes into contact with a surface of the cavity at the time of runflat running. Thus, the friction heat at the time of runflat running is reduced and lubricant which was previously applied to the cavity surface is absorbed or wiped off by the tire resonance preventing member q, and there is a problem that the runflat endurance is deteriorated. Further, the core body p having substantially T-shaped cross section is heavy and deteriorates the rolling resistance.

The latter system also has a problem that since the sidewall w4 is heavy, the entire weight is increased. Further, this system requires complicated and severe operations such as mounting operation of the tubes v on the sidewall w4, mounting operation of the cavities on the sidewall w4, and tuning operation of the vibration characteristics of the resonator, so that it takes a lot of trouble to assemble.

It is a main object of the present invention to provide a runflat tire system which reduces road noise by suppressing the resonance in the cavity, and which is light in weight and has excellent runflat endurance, and to provide a support ring used for the runflat tire system.

According to the present invention, a runflat tire system comprises:
 a pneumatic tire;
 a wheel rim on which the pneumatic tire is mounted; and
 a support ring made of elastic material and disposed in a cavity surrounded by an inner surface of the rim and an inner surface of the tire mounted thereon, wherein
 the support ring comprises an annular body extending in a circumferential direction of the tire and provided with a plurality of hollows opening at the cavity, and
 at least one noise damper made of sponge material having apparent density of 0.1 g/cm3 or less and disposed in the hollow such that the noise damper does not protrude into the cavity from an inlet surface of the hollow.

According to the runflat tire system and the support ring used therefor of the present invention, the noise damper absorbs resonance energy in the cavity, and reduces road noise. With this, comfortable habitability in a passenger room can be obtained. Further, since the noise damper is disposed such that it does not protrude into the cavity from the inlet surface of the hollow, lubricant which was previously applied to the cavity is not absorbed or wiped off. Therefore, the runflat endurance is not deteriorated. Further, since the noise damper has low density and is light in weight, the entire system is reduced in weight.

DESCRIPTION OF THE PREFERRED EMBODIMENTS

Figure 1:
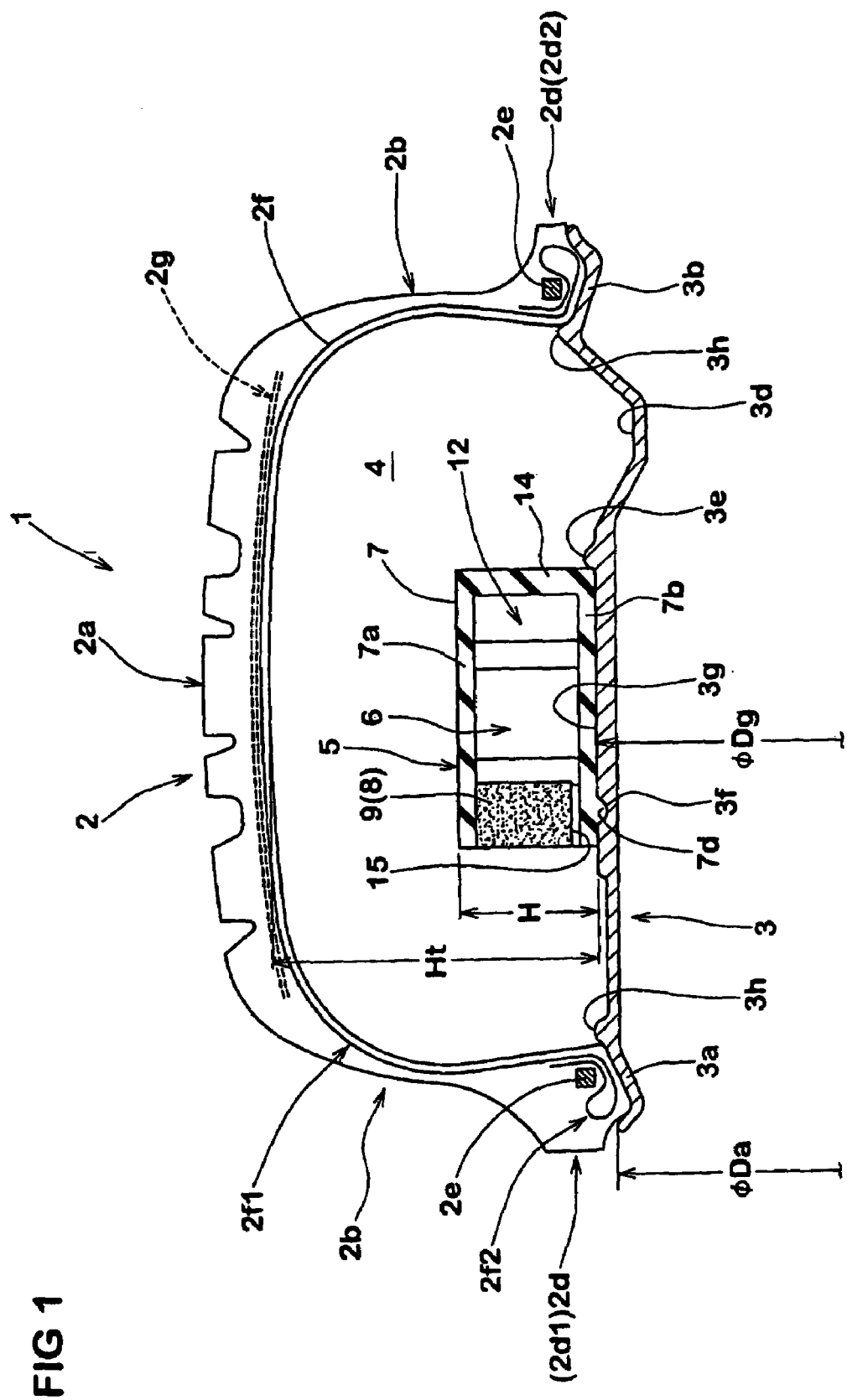
FIG. 1 is a sectional view showing a runflat system of the present invention.

In the drawing, a runflat tire system 1 according to the present invention comprises a pneumatic tire 2, a wheel rim 3 and a support ring 5 disposed in a cavity 4 surrounded by an inner surface of the rim 3 and an inner surface of the tire 2 mounted thereon.

The pneumatic tire 2 comprises: a tread portion 2*a*; a pair of axially spaced bead portions 2*d* each with a bead core 2*e* therein; a pair of sidewall portions 2*b*; a carcass 2*f* extending between the bead portions 2*d* through the tread portion 2*a* and sidewall portions 2*b*; and a belt 2*g* disposed radially outside the carcass 2*f* in the tread portion 2*a*.

In order to use the tire 2 without a tire tube, the inner surface of the tire 2 is covered with air-impermeable rubber which is provided as so called inner liner.

The carcass 2*f* comprises a radial ply of cords. The ply extends between the bead portions 2*d* beyond the bead core 2*e* to the axially outside thereof in each bead portion 2*d* through the radially inside of the bead core 2*e*, and then the ply is turned back radially outwardly to the axially inside of the bead core 2*e*, passing between the carcass ply main 2*f*1 and the bead core 2*e*, so as to form a loop 2*f*2 filled with rubber. The turned back portion extends radially outwards along the carcass ply main 2*f*1 and then terminates in the bead portion so that the edge is positioned at radial position slightly radially outside the radially outer end of the bead core. Therefore, when the tension is applied to the carcass ply main portion 2*f*1, the loop 2*f*2 is pulled axially inwards. As the loop 2*f*2 has rubber therein, it functions as a wedge driven into the narrow space between the bead core 2*e* and bead seat (3*a* or 3*b*). Thus, the carcass ply 2*f* is firmly locked.

The wheel rim 3 comprises: a first bead seat 3*a* for the first bead portion 2*d*1; a second bead seat 3*d* for the second bead portion 2*d*2; a rim well 3*d* provided near to the second bead seat 3*b* which is used when mounting the tire; a mounting portion 3*g* for the support ring 5 provided between the rim well 3*d* and the first bead seat 3*a*; a hump 3*e* formed along the axial edge of the mounting portion 3*g* on the rim well side; and a groove 3*f* provided in the mounting portion 3*g* near the other axial edge of the mounting portion 3*g*.

The first and second bead seats 3*a* and 3*b* are tapered axially outwards contrary to the conventional wheel rims whose bead seats are tapered towards the axial center (tire equator).

In this embodiment, as the inside diameter of the first bead portion 2*d*1 is smaller than that of the second portion 2*d*2, the first bead seat 3*a* is accordingly made smaller in diameter than the second bead seat 3*b*.

The mounting portion 3*g* is substantially centered on the center of the axial width of the rim or the axial center of the tread width of the tire The diameter Dg of the mounting portion 3*g* is more than the diameter Da of the rim flange of the first bead seat 3*a*.

The hump 3*e* extends continuously in the circumferential direction so as to function as a stopper for preventing the axial displacement of the support ring 5 towards the rim well as well as positioning the support ring 5.

Also, a circumferentially continuously extending hump 3*h* is formed at the axially inner end of each bead seat 3*a*, 3*b*.

The support ring 5 comprises an annular body 7 made of an elastic material and at least one noise damper 9. This support ring 5 supports the tread portion 2*a* from that inner side so as to enable traveling for a long distance when the tire goes flat.

It is preferable for the durability that the elastic material, such as rubber material, has a hardness of from 45 to 60 degrees and a loss tangent (tan delta) of from 0.02 to 0.08. Here, the hardness means the durometer type-D hardness measured according to Japanese Industrial Standard JIS-K6253 at a temperature of 23+2 degrees C. The loss tangent is measured with a viscoelastic spectrometer under the following conditions: frequency of 10 Hz; temperature of 100 deg. C.; initial elongation of 10%; and dynamic strain amplitude of +0.25%.

For example, polyurethane, rubber, EPDM and the like can be used as the elastic material. In this embodiment, the support ring 5 is formed as a casting of polyurethane.

The annular body 7 comprises: a radially outer annular portion 7*a* coming into contact with the inside of the tread portion 2*a* when the tire goes flat; a radially inner annular portion 7*b* secured to the wheel rim 3; and a supporting wall portion 14 bridging between the inner and outer annular portions 7*a* and 7*b*, while circumferentially extending in a zigzag manner in this embodiment.

The radially inner circumferential surface of the inner annular portion 7*b* is provided with a protrusion 7*d* which accommodates to the above-mentioned groove 3*f* of the wheel rim 3. Excepting the protrusion 7*d*, the radially inner circumferential surface has an inside diameter of which value is constant and slightly smaller than the outside diameter Dg of the mounting portion 3*g* of the wheel rim 3. In other words, the inside diameter of the support ring 5 is slightly smaller than the outside diameter Dg of the mounting portion 3*g* of the wheel rim 3. Thus, when mounted, the support ring 5 can fit tightly to the mounting potion 3*g* due to the elastic deformation of the support ring 5.

As shown in FIG. 1, a radial height H of the support ring 5 is set in the range of not less than 35%, preferably more than 40%, but not more than 65%, preferably less than 58%, more preferably less than 50% of the radial height Ht of the tire cavity. If the radial height H is too high, the support ring 5 is very liable to contact with the inside of tread portion 2*a* during normal running, and not only ride comfort but also steering stability and the like are deteriorated. If the radial height H is too low, under runflat mode, a flexure if the tire becomes large and worsens driving stability and runflat distance.

Here, the heights H and Ht are defined as follows under such a standard condition that the support ring 5 and the tire 2 are mounted on the wheel rim 3 and the tire is inflated to a standard pressure (design pressure) and loaded with no tire load: the radial height H of the support ring 5 is measured in the radial direction from the mounting portion 3*g* to the radial outmost point of the support ring 5; and the radial height Ht of the tire cavity is measured in the radial direction from the mounting portion 3*g* to the radially outmost point on the inner surface of the tread portion. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure.

Figure 4:
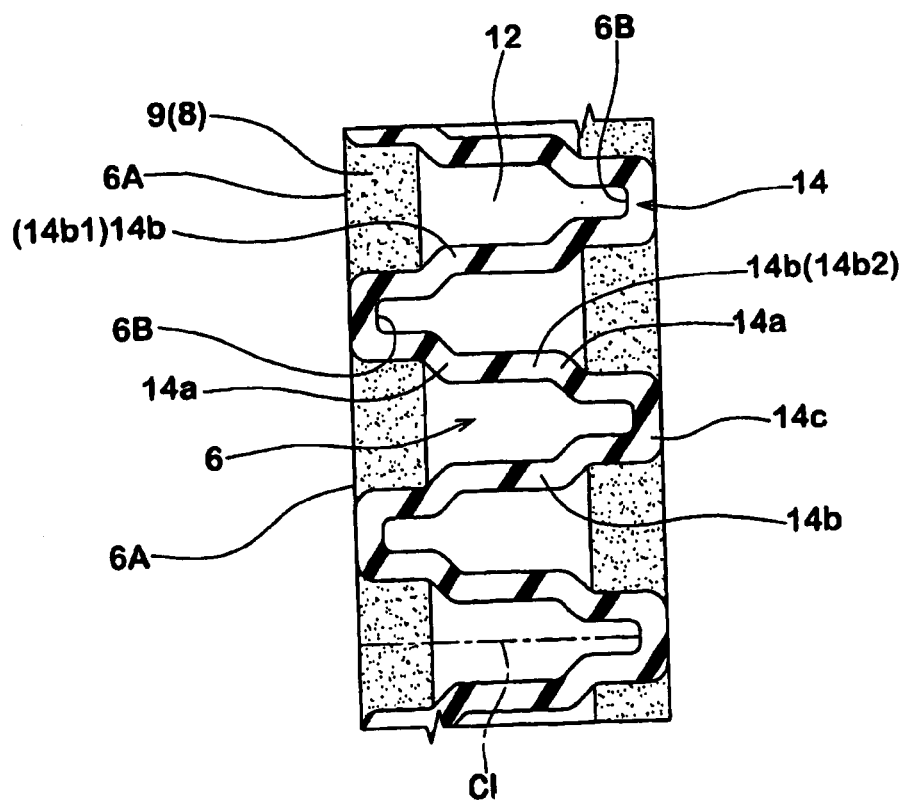
FIG. 4 is a development view taken along line A—A in FIG. 3.

As shown in FIG. 4, the supporting wall portion 14 comprises two kind of inclining portions 14b1 and 14b2 each including two step portions 14a and extending in stages in the axial direction of the tire, and joint portions 14c each connecting circumferentially adjacent inclining portions 14b1 and 14b2 to each other at end portions in the axial direction of the tire.

Figure 2:
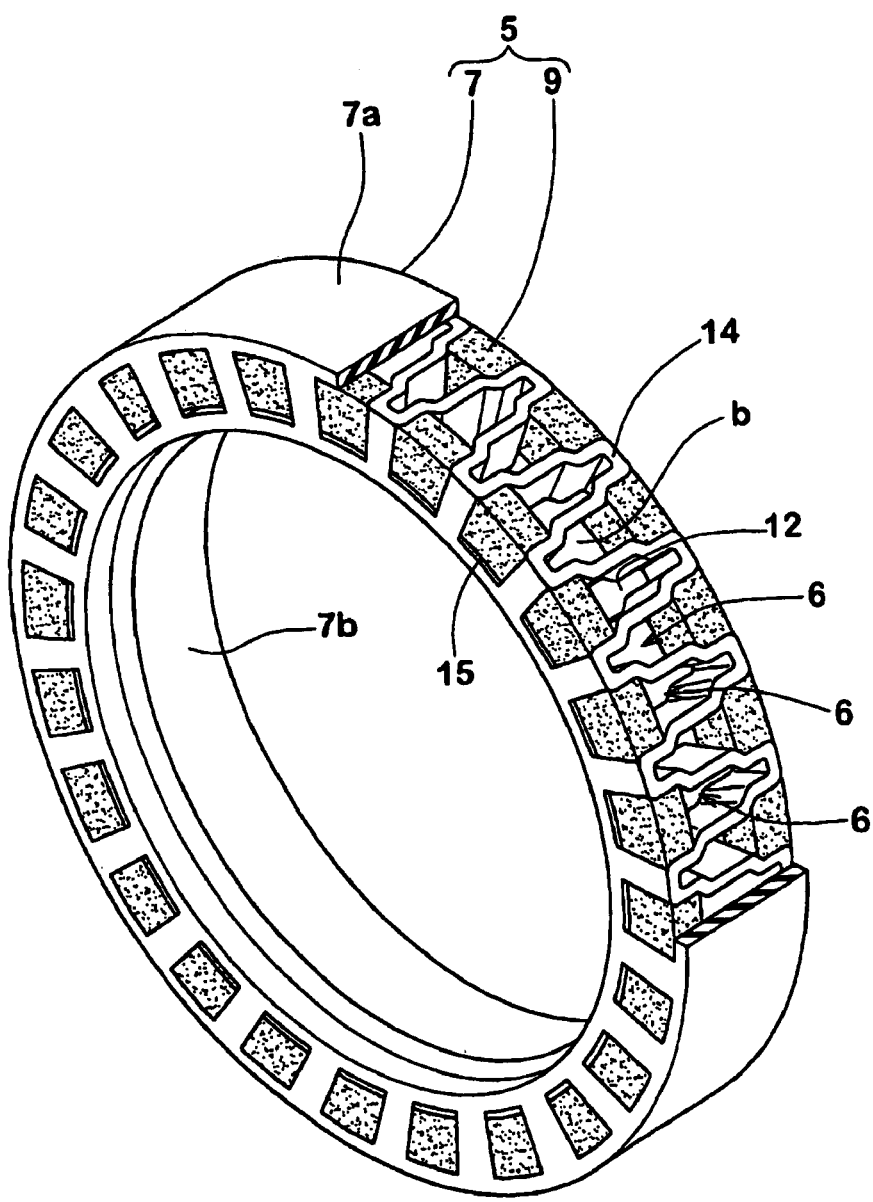
FIG. 2 is a perspective view showing a support ring of FIG. 1.

The annular body 7 is provided with a plurality of hollows 6 which open at the cavity 4 and which are defined by the outer annular portion 7a, the inner annular portion 7b and the supporting wall portion 14, on the side surface in the axial direction of the tire. As shown in FIG. 2 or 4, one of the hollows 6 is surrounded by the outer annular portion 7a, the inner annular portion 7b, a pair of inclining portions 14b1 and 14b2, and one of the joint portions 14c.

In this embodiment, the hollows 6 are provided such that the hollows 6 alternately open on both sides in the axial direction of the tire and continuously in the circumferential direction of the tire. Since the hollows 6 are disposed on axially both sides of the tire and alternately while keeping balance, the balance of weight of the annular body 7 is equalized, and vibration is prevented from generating at the time of high speed running.

The hollow 6 has a depth extending from an inlet surface 6A which opens at the side surface in the axial direction of the tire to a bottom 6B thereof. Various shapes can be employed as the inlet surface 6A such as circular, rectangular, triangular shapes, groove-like shape extending in the circumferential direction or axial direction of the tire, and a through hole-like shape formed in the axial direction of the tire.

The number of hollows 6 and a volume of one hollow 6 are appropriately determined such that the annular body 7 can sufficiently support a load in the runflat state. A preferable total volume of the hollows 6 is in a range of from 20 to 50% of an apparent volume of the annular body 7 for example. The apparent volume of the annular body 7 is the sum total volume of all of the hollows 6 and the annular body 7. Such annular body 7 largely reduces the weight of the support ring 5 and enhances the running performance.

As shown in FIG. 4, an area of the hollow 6 intersecting with a direction of the depth is reduced from the inlet surface 6A toward the bottom 6B. In this example, the width of the hollow 6 in the circumferential direction is narrowed step-wisely or in stages by the step portions 14a of the supporting wall portion 14.

The noise damper 9 is made of porous sponge material 8, and is fixed to the hollow 6. Here, the sponge material means not only a foamed elastomer or plastic of an open-cell or closed-cell type but also shaped intertangled fiber such as synthetic fiber, plant fiber and animal fiber. In the undermentioned examples, open-cell type poly-urethane foam is preferably used. The sponge material has high vibration isolation ability and sound absorption ability, and efficiently absorbs vibration energy in the cavity 4. As a result, the resonance is suppressed, and road noise becomes small.

It is preferable that the sponge material 8 has heat resistance capable of withstanding heat (e.g., 140° C.) generated at the time of runflat running.

Preferable materials for the sponge material 8 are synthetic resin sponge such as ether-based polyurethane sponge, ester-based polyurethane sponge, polyethylene sponge, and rubber sponge such as chloroprene rubber sponge (CR sponge), ethylene propylene rubber sponge (EDPM sponge), nitrile rubber sponge (NBR sponge). In view of sound-reduction performance, light-weighted performance, foaming adjustability, endurance and the like, especially preferable materials are urethane-based sponge and polyethylene-based sponge such as ether-based polyurethane sponge. An example of such ether-based polyurethane sponge is a product No. E16 produced by MARUSUZU CO., LTD.

The sponge material 8 has the apparent density of 0.1 g/cm$^3$ or less, but it is preferable that the apparent density is 0.06 g/cm$^3$ or less, and more preferably 0.04 g/cm$^3$ or less. By using such a low density sponge, the weight of the tire and harmful effect on the tire balance are suppressed, voidage is increased and sound absorption is enhanced. If the apparent density exceeds 0.1 g/cm$^3$, the weight of the system 1 is increased, the voidage is reduced and the suppressing effect of resonance is prone to be deteriorated.

In this embodiment, the noise damper 9 is compressed and in this state, the noise damper 9 is fixed to the hollow 6. In other words, the noise damper 9 is fixed to the hollow 6 utilizing its elastic force. Therefore, the noise damper 9 can easily be fixed to the hollow 6. Further, it becomes easy to determine whether the noise damper 9 is mounted on each hollow 6, and it is easy to adjust the sound suppressing performance.

A compression ratio which is a ratio of a volume of the noise damper 9 after it is fixed and a volume thereof in its free state before it is fixed is preferably 70% or higher, and more preferably 80% or higher, and its upper limit is preferably 95% or lower. If the compression ratio is less than 70%, the voidage of the sponge material 8 is reduced due to high compression, the sound absorption is lowered, and if the compression ratio exceeds 95%, the noise damper 9 is prone to fall out from the hollow 6. In this regard, it is also possible to reliably fix the sponge material 8 to the hollow 6 using fixing means such as adhesive and double-faced tape.

The noise damper 9 is disposed such that it does not protrude from the inlet surface 6A of the hollow 6 toward the cavity 4. With this, the noise damper 9 does not absorb or wipe off a lubricant for reducing friction caused at the time of runflat running which was previously applied to the cavity surface of the tire 2. Thus, runflat running endurance can be maintained. It is preferable that a surface of the noise damper 9 is recessed toward the bottom side by about 3 to 7 mm from the inlet surface 6A in view of thermal expansion, slight positional deviation caused by vibration, amounting error and the like.

In this embodiment, the noise damper 9 has a volume of 20% or more of a volume of the hollow 6, more preferably 30% or more, and its upper limit is about 100% when it is fixed in the hollow 6. If this ratio is less than 20%, there is a tendency that the sound suppressing performance is insufficient. The noise damper 9 of this embodiment is the massive body having a volume of about 35% of the volume of the hollow 6 as shown in FIG. 4, and the noise dampers 9 are disposed on the side of the inlet surface 6A with respect to all hollows 6. With this, a gap 12 between the noise damper 9 and the bottom 6B in the hollow 6 is provided.

The area of the hollow 6 intersecting the direction of the depth is reduced toward its bottom 6B side. As a result, an area of the hollow 6 closer to the inlet surface 6A is relatively larger. This increases sound energy absorbed by the noise damper 9 and enhances the road noise reducing effect. When the noise damper 9 is fixed to the inlet surface 6A of the hollow 6 as in this embodiment, a large surface area of the noise damper 9 facing the cavity 4 can be obtained, and the sound suppressing ability can further be enhanced.

Figure 3:
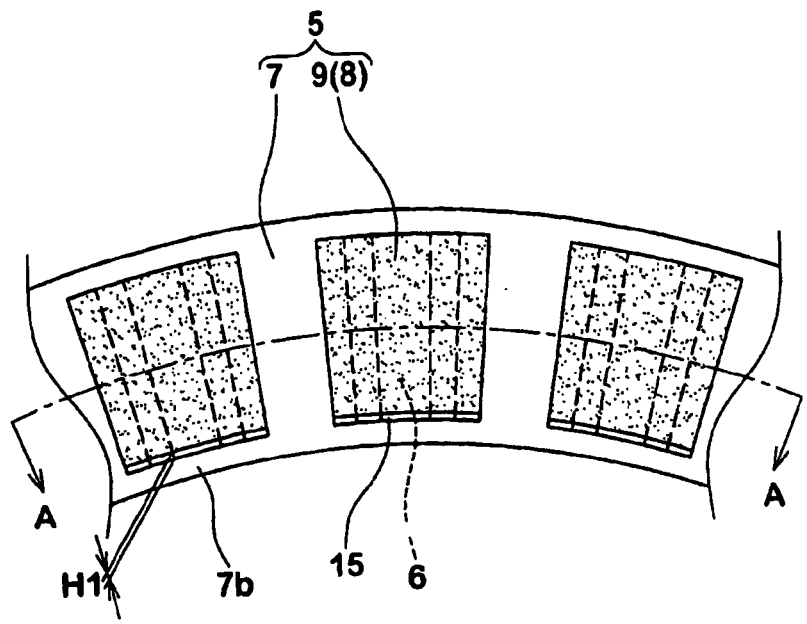
FIG. 3 is a partial side view of the support ring.

As shown in FIGS. 1 and 3, each noise damper 9 has at least one air through holes 15. In this embodiment, the air through hole is provided between the radially inner surface in the noise dampers 9 and the inner annular portion 7b. The hole 15 extends toward the bottom side of the hollow 6 and communicates between the cavity 4 and the gap 12. Therefore, air which is vibrating in the cavity 4 is led to the gap 12 through the holes 15. As a result, vibration of the air is damped by interference. Since sound energy is absorbed also from the surface of the noise damper 9 facing the hole 15, the sound suppressing ability is exhibited more strongly.

The radial height H1 of the hole 15 is 1 mm or more, preferably 2 mm or more, and its upper limit is 20 mm or less, and more preferably 10 mm or less. If the height H1 is less than 1 mm, vibration energy entering into the gap 12 is small, and if the height H1 exceeds 20 mm, the surface area of the noise damper 9 facing the cavity 4 is reduced.

Figure 6:
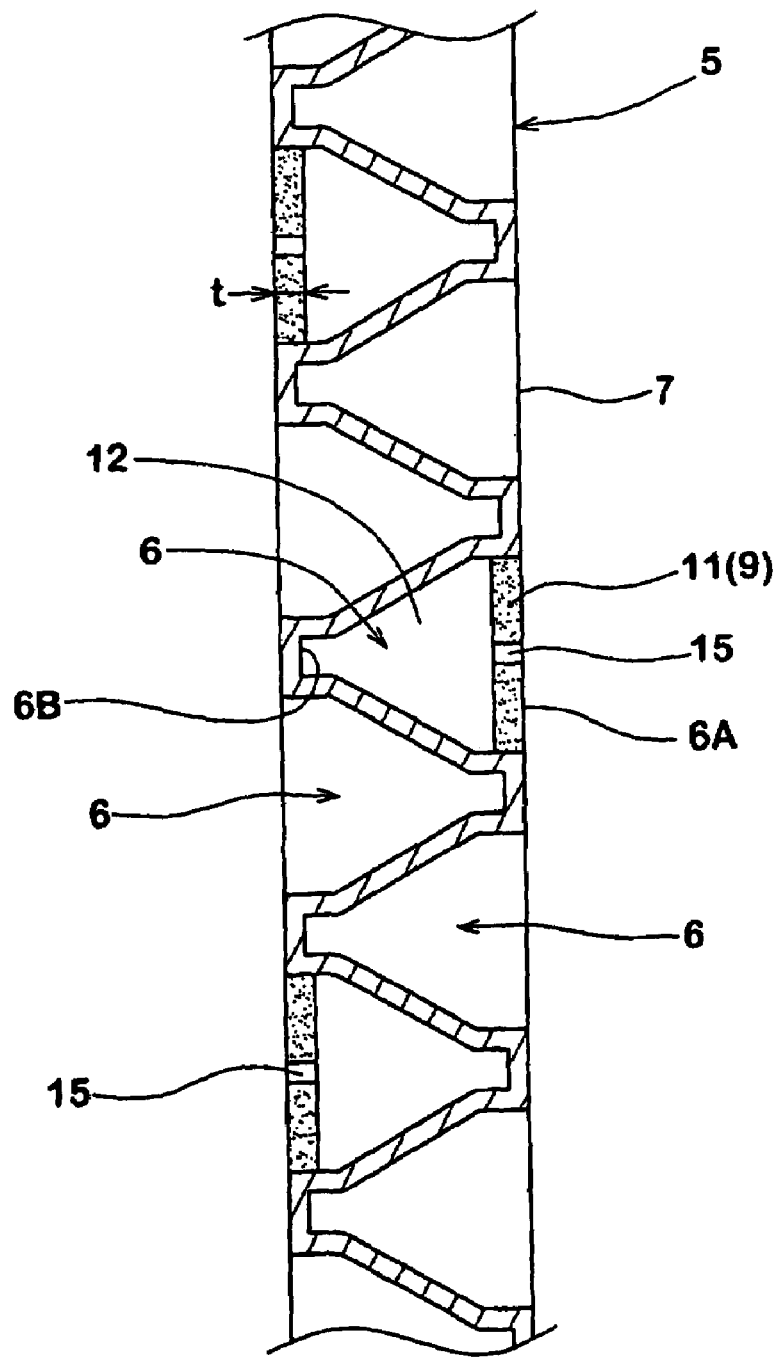
FIG. 6 is a development view taken along line A—A in FIG. 3 showing another embodiment of the support ring.

FIG. 6 shows another embodiment of the support ring 5. The noise damper 9 of this embodiment is constituted by a lid body 11 which is fitted into the inlet surface 6A of the hollow 6 and covers the inlet surface 6A. A relatively hard sponge material 8 is used for this lid body 11, and a thickness t of the lid body 11 is about 3 to 10 mm for example. With this noise damper 9, the system 1 can further be reduced in weight. In this example, the hollows 6 are separated from one another in the circumferential direction, and the noise dampers 9 are disposed every three hollows 6.

The lid body 11 is provided at its substantially central portion with at least one air through hole 15. Vibrating air passes through the through hole 15 and can enter the gap 12. With this structure, as described above, the resonance suppressing effect can be obtained by interference between the vibrations and by the sound suppressing ability of the back surface of the lid body 11. An opening area of the through hole 15 is preferably in a range of 5 to 30% of a surface area of the lid body 11.

Figure 7:
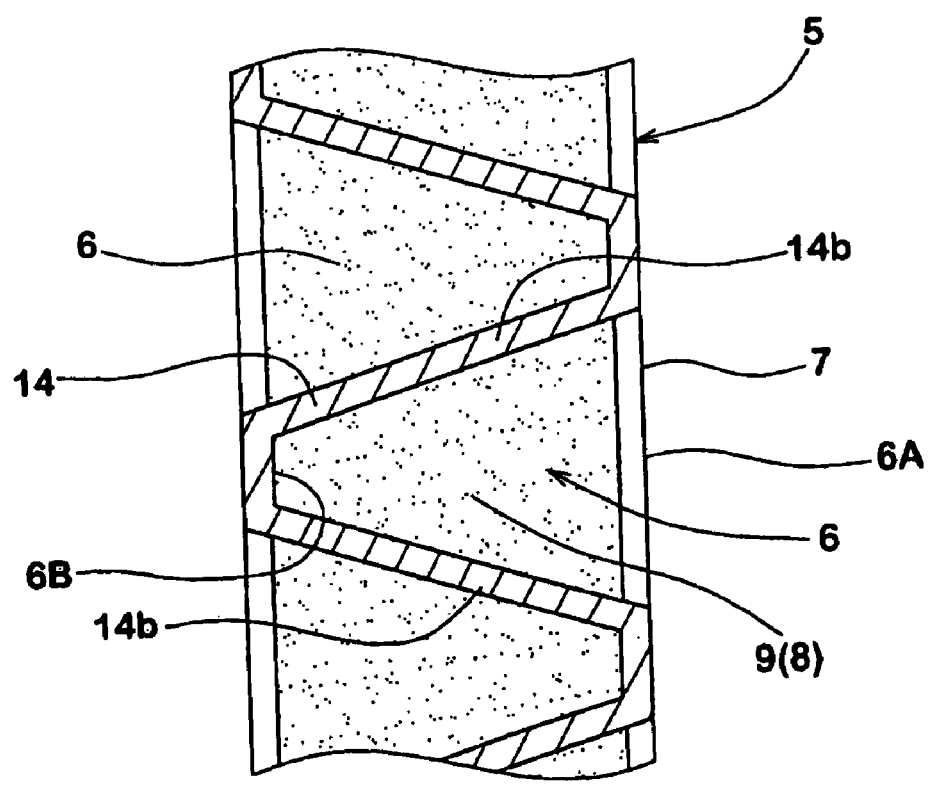
FIG. 7 is a development view taken along line A—A in FIG. 3 showing another embodiment of the support ring.
Figure 8:
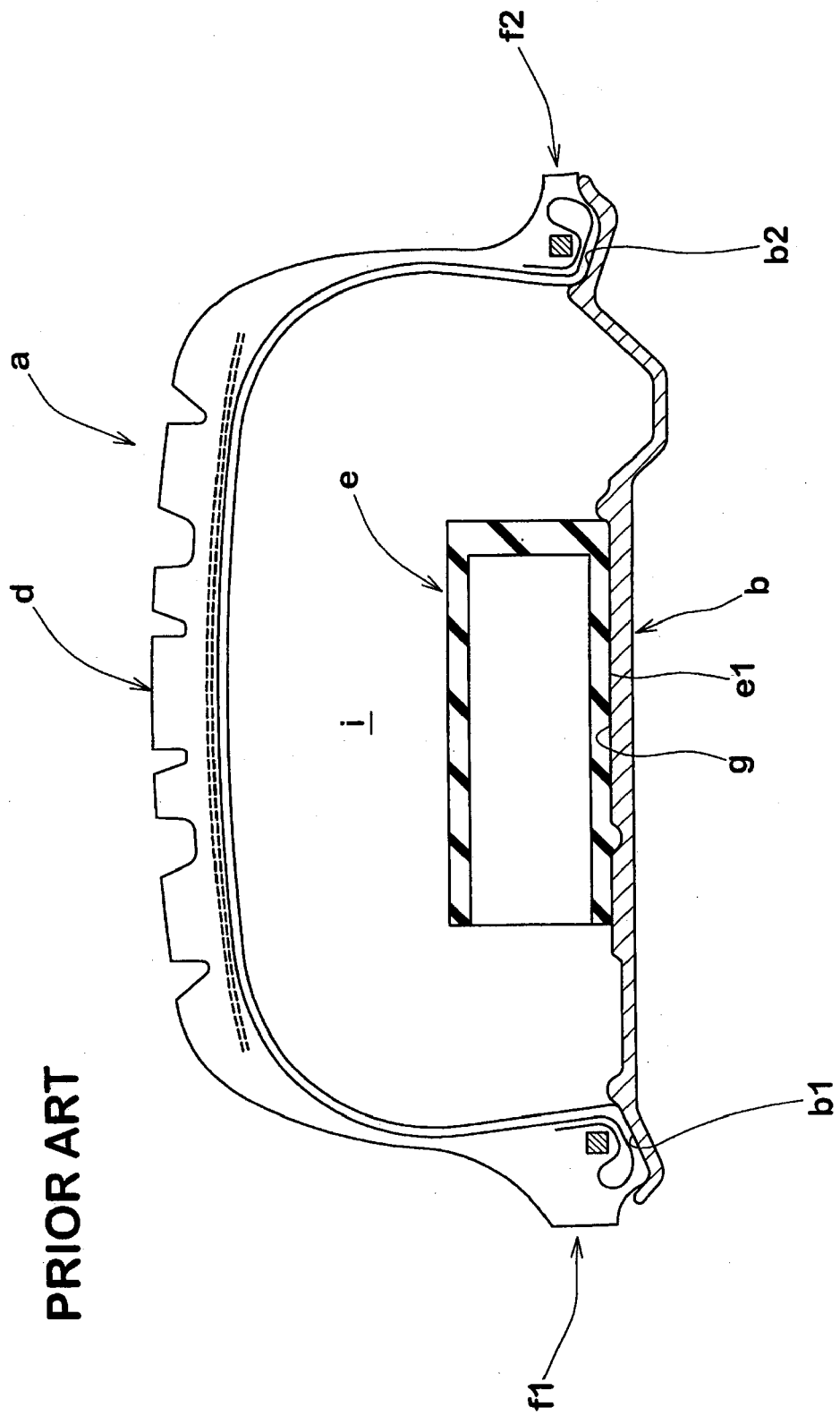
FIG. 8 is a sectional view of a conventional runflat system.
Figure 9:
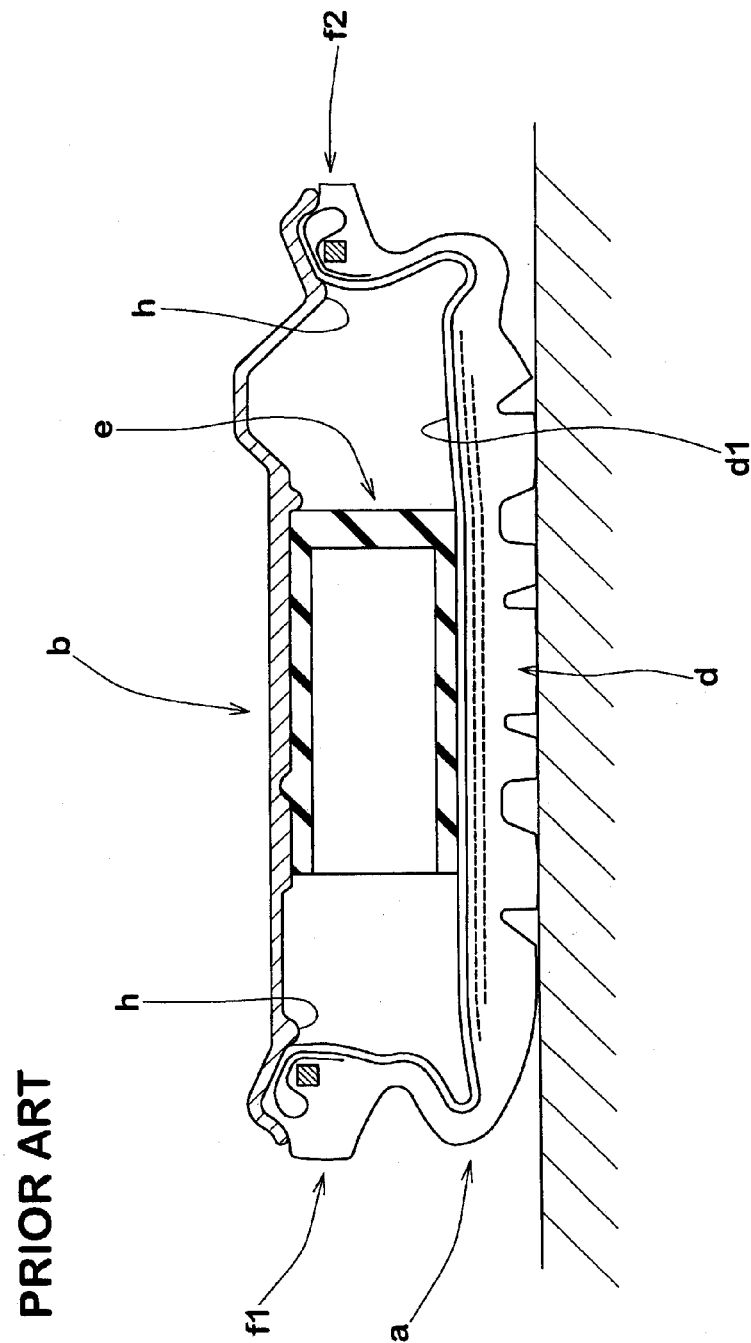
FIG. 9 is a sectional view showing a low internal pressure state of the system in FIG. 8.
Figure 10:
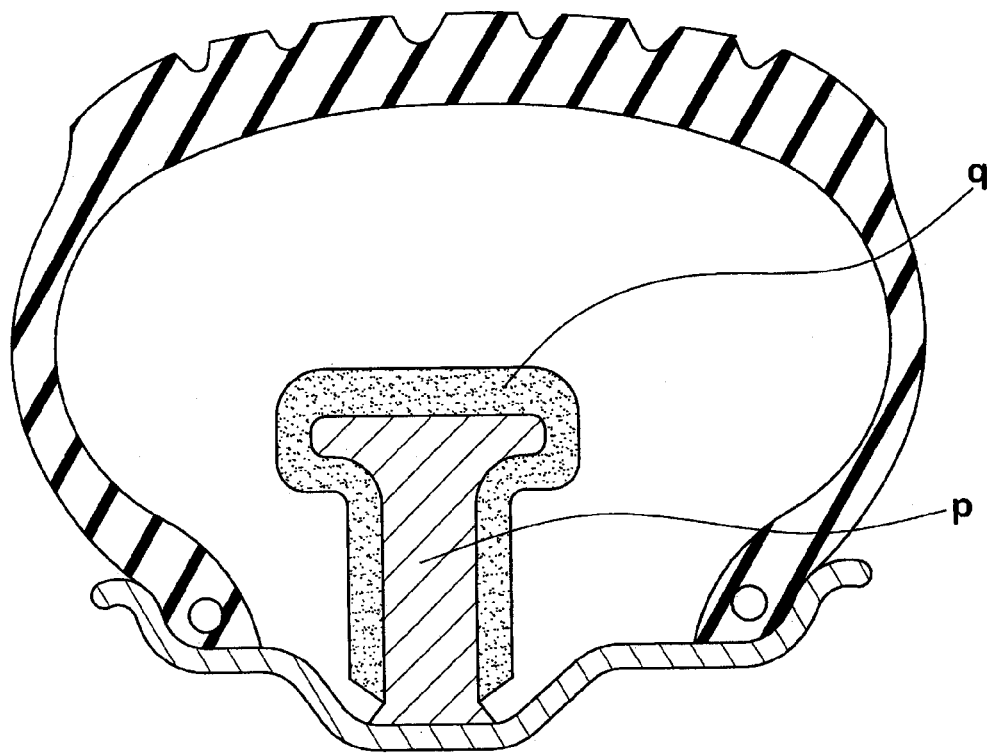
FIG. 10 is a sectional view of another conventional assembly.
Figure 11:
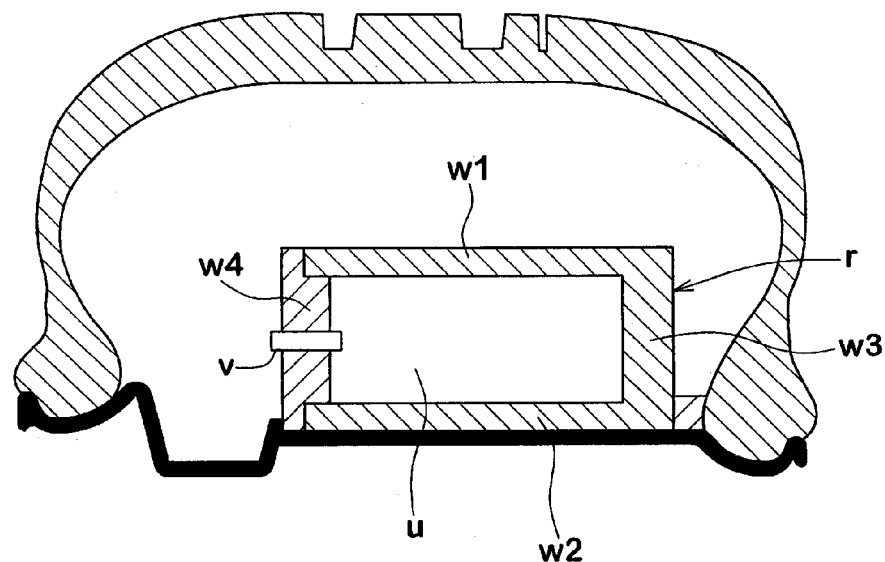
FIG. 11 is a sectional view of another conventional assembly.
Figure 12:
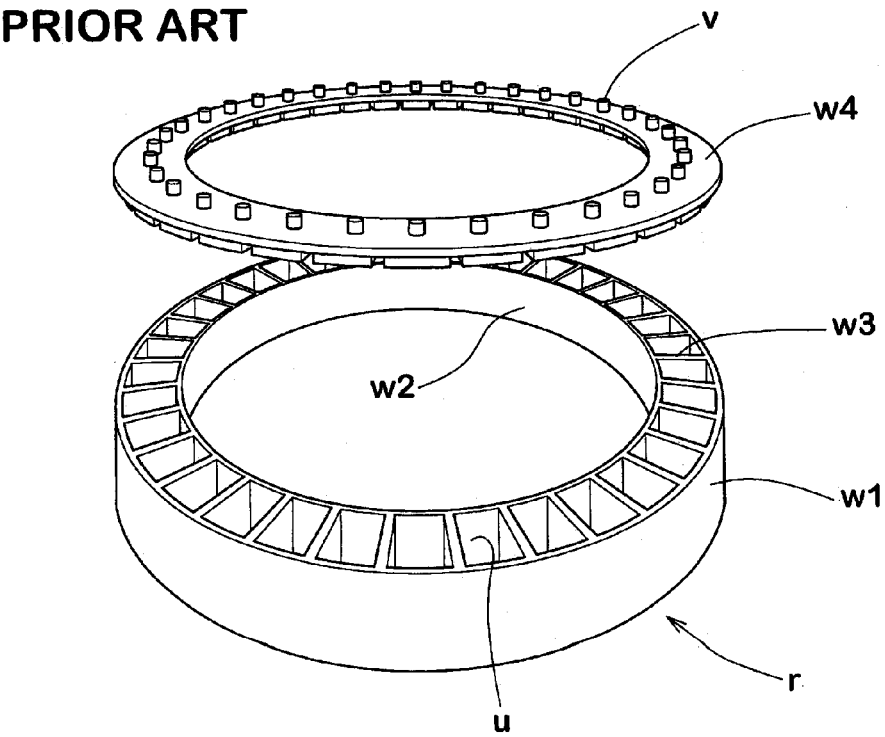
FIG. 12 is an exploded perspective view of a conventional support ring.

FIG. 7 shows another embodiment of the support ring 5. The annular body 7 of this embodiment is provided with hollows 6, each of the hollows 6 being sandwiched between the inclining portions 14b of the supporting wall portion 14. A width of the hollow 6 in the circumferential direction of the tire is gradually reduced from the inlet surface 6A toward the bottom 6B. The noise dampers 9 are fitted into all hollows 6. The noise damper 9 is made of sponge material 8 charged into its bottom 6B without the gap. A surface 8a of the sponge material 8 closer to the inlet surface 6A is recessed from the inlet surface 6A by several millimeters so as to prevent the surface 8a from protruding toward the cavity 4 due to thermal expansion or the like.

EXAMPLE

Runflat systems were prototyped using support rings having a structure shown in FIG. 1. A noise damper produced based on a specification shown in Table 1 was mounted on each support ring. Tires of 225-680R460A were used, and wheel rims of 225'460A were used. A replica reaction force test was carried out for each system.

Figure 5:
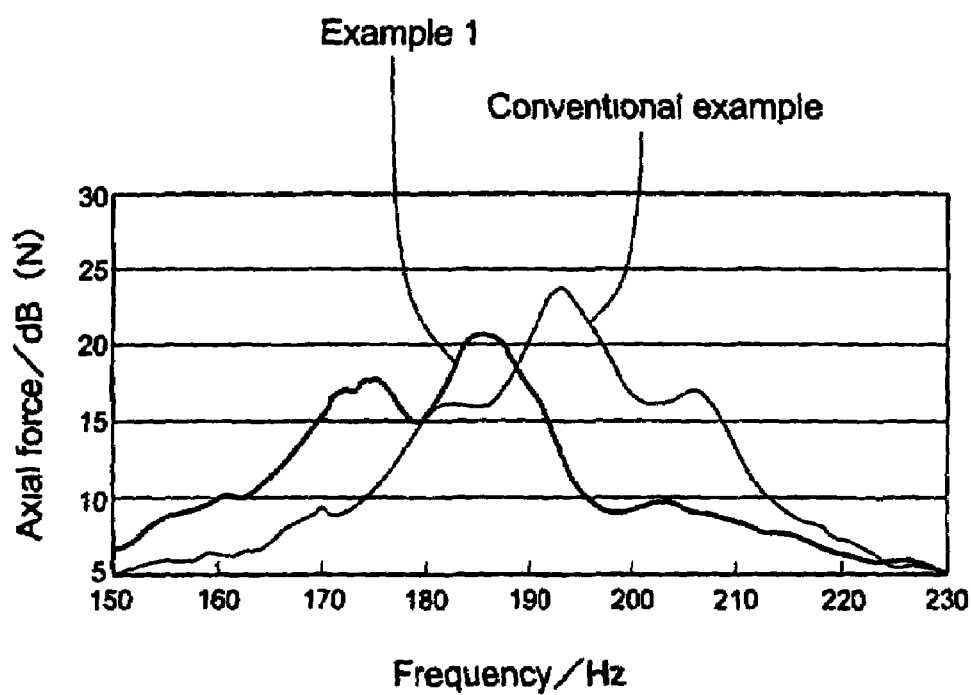
FIG. 5 is a graph showing a result of frequency analysis of variation in axial force in the vertical direction in a drum running test of the systems.

The replica reaction force test was carried out in such a manner that each system was allowed to run on a drum under the following conditions: internal pressure of 200 kPa, load of 5.1 kN, and speed of 60 km/h, variation of axial force in the vertical direction at that time was measured and frequency was analyzed. FIG. 5 shows results of frequency analysis of an example 1 of the present invention and a conventional example. From the frequency analysis, a peak value of axial force variation was obtained, and the value is shown in Table 1 as an evaluation value of running road noise. It has been confirmed that the peak value of the axial force variation correlate with a road noise measurement result of an actual vehicle. The results of the test and the like are shown in Table 1.

TABLE 1

| | Conventional Example | Example 1 | Example 2 | Example 3 | Example 4 | Comparative Example 1 |
|---|---|---|---|---|---|---|
| Annular body | | | | | | |
| Size (mm) | 80–460(45) | 80–460(45) | 80–460(45) | 80–460(45) | 80–460(45) | 80–460(45) |
| Inlet surface size of hollow (mm) | 37 × 37 | 37 × 37 | 37 × 37 | 37 × 37 | 37 × 37 | 37 × 37 |
| Noise damper | Absence | Presence | Presence | Presence | Presence | Presence |
| Material | — | Polyurethane foam | Polyurethane foam | Polyurethane foam | Polyurethane foam | Polyurethane foam |
| Apparent density (g/cm$^3$) | — | 0.035 | 0.016 | 0.016 | 0.016 | 0.11 |
| Size (mm) (volume ratio) | — | 40 × 37 × 20 (35%) | 40 × 30 × 20 (31%) | 100% | 40 × 30 × 10 (16%) | 40 × 37 × 20 (35%) |
| Height of the hole (mm) | — | Absence | 7 | Absence | 7 | Absence |
| Protrusion | — | Absence | Absence | Absence | Absence | Absence |
| Peak value of variation of vertical axial force (dB) | 24 | 21.2 | 22.5 | 21.5 | 23.6 | 23.7 |

What is claimed is:

1. A support ring for runflat tire system comprising:
   an annular body made of elastic material and extending in a circumferential direction of the tire, wherein
   the support ring comprises
   an annular body extending in a circumferential direction of the tire and provided with a plurality of hollows opening at the cavity,
   at least one noise damper made of sponge material having apparent density of 0.1 g/cm$^3$ or less and disposed in the hollow such that the noise damper does not protrude into the cavity from an inlet surface of the hollow, and a gap being provided between the noise damper and a bottom of the hollow.

2. The support ring for runflat tire system according to claim 1, wherein the noise damper has at least one air through hole communicating between the gap and the outside of the gap.

3. A runflat tire system comprising:

a pneumatic tire;

a wheel rim on which the pneumatic tire is mounted; and a support ring made of elastic material and disposed in a cavity surrounded by an inner surface of the rim and an inner surface of the tire mounted thereon, wherein the support ring comprises an annular body extending in a circumferential direction of the tire and provided with a plurality of hollows opening at the cavity, at least one noise damper made of sponge material having apparent density of 0.1 g/cm$^3$ or less and disposed in the hollow such that the noise damper does not protrude into the cavity from an inlet surface of the hollow, and a gap being provided between the noise damper and a bottom of the hollow.

4. The runflat tire system according to claim 3, wherein the annular body is made of rubber material.

5. The runflat tire system according to claim 3, wherein the hollow has a depth extending from the inlet surface to a bottom thereof, and an area of the hollow intersecting with a direction of said depth is reduced toward the bottom from the inlet surface.

6. The runflat tire system according to claim 3, wherein the noise damper has at least one air through hole communicating between the cavity and the gap.

7. The runflat tire system according to claim 3, wherein the noise damper has a volume in a range of from 20 to 100% of the hollow.

8. The runflat tire system according to claim 3, wherein the annular body comprises:

a radially outer annular portion coming into contact with a inside of a tread portion of the tire when the tire goes flat;

a radially inner annular portion secured to the rim; and a supporting wall portion bridging between the inner and outer annular portion while circumferentially extending in a zigzag so as to form the hollows which open at opposite sides alternately in the axial direction of the tire.

* * * * *